Oct. 1, 1957

G. DARCY ET AL 2,808,255

ROTATABLE TOOL HOLDER FOR MACHINING CYLINDRICAL MEMBERS

Filed May 2, 1952

INVENTORS
GEORGES DARCY, &
JEAN PENNECOT,

BY *Stone, Boyden & Mack.*

ATTORNEYS

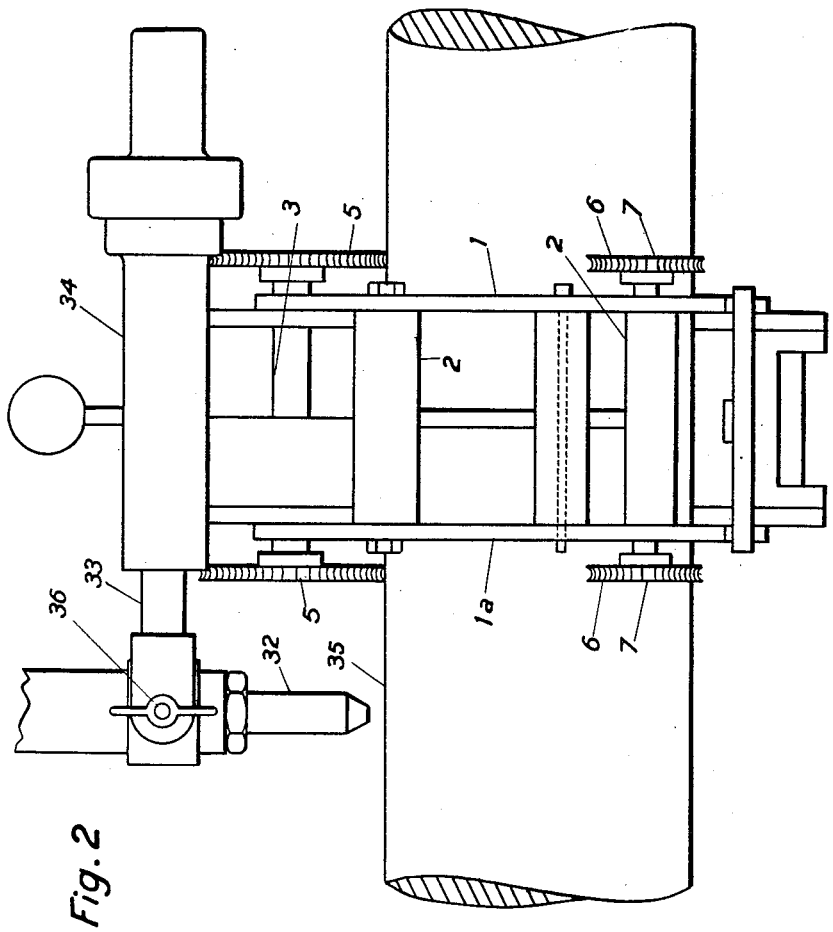
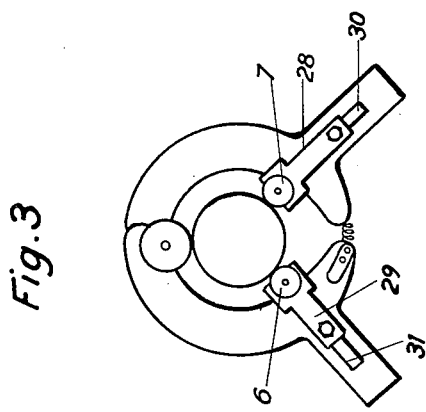
INVENTORS
GEORGES DARCY, &
JEAN PENNECOT,

United States Patent Office 2,808,255
Patented Oct. 1, 1957

2,808,255

ROTATABLE TOOL HOLDER FOR MACHINING CYLINDRICAL MEMBERS

Georges Darcy, Champigny-sur-Marne, France, and Jean Pennecot, Saigon, Indo-China, assignors to L'Air Liquide, Société Anonyme pour l'Etudes et l'Exploitation des Procédés Georges Claude, Paris, France Application May 2, 1952, Serial No. 285,612

Claims priority, application France May 4, 1951

3 Claims. (Cl. 266—23)

Our invention concerns tool holders, wherein the tool is displaced about a part having the shape of a cylinder of revolution, along a cross section of said part and which can be used on parts having various diameters.

It concerns, more particularly the case when the tool is an oxy-cutting torch, for instance, and is held at a constant distance from the part during the rotation thereof about the part, whatever may be the diameter of said part, by three clamping and guiding rollers, with their axes parallel with that of the work; it is characterized in that the tool holder consists of two jaws carrying the rollers and articulated with respect to each other, their free ends being recoiled elastically towards each other and the rollers being spaced about the work the angular spacing between two consecutive rollers being less than 180° and this angular spacing being preferably equal to 120°.

This arrangement allows an easy placing in position of the device, for instance on a tube to be cut, by opening the two jaws, and ensures a clamping of the rollers on the work at three points uniformly distributed about the work and, consequently, a better guiding.

The tool holder also comprises the following features: The articulation axis of the two jaws, parallel with the axis of the work, coincides with the axis of one of the rollers, the axes of each one of the two rollers being respectively carried by said jaws, and being capable of being displaced on each one of the jaws substantially in a plane passing through the extreme positions of the axes of the rollers when the latter are in contact with parts having a maximum and a minimum diameter.

This characteristic may be obtained by a form of embodiment consisting in that each one of the two rollers or pairs of rollers is carried by an articulated arm, the articulation axis of which is located in the plane perpendicular on the middle of the straight line going through the centers of the roller at the two extreme positions of said roller, corresponding to its contact with the cylindrical parts having a maximum and a minimum diameter, the arms having a sufficient length for the displacement to coincide substantially with the above defined straight line, said articulated arms being combined with means for the locking on the jaws.

According to a modification of the invention, each roller or pair of rollers is carried by a part connected with the corresponding jaw by a slide.

These arrangements make it possible to adapt the tool carrier easily and rapidly to parts having various diameters, while ensuring an efficient clamping on the part. The contact points of the rollers with the part are distant, angularly, by 120°, whatever may be the diameter of the tube on which the device is being used and the spacing between the free ends of the jaws is substantially constant, so that the tensioning device only requires an adjustment of a very small amplitude, making it possible to adapt this clamping to the hardness of the parts to be machined. In addition, the clamping on the tube is all the more powerful as the diameter of the part is smaller and substantially in inverse proportion to the diameter of the part.

The first type of embodiment of the invention, applied to the torch cutting of tubes is described hereinafter, by way of example, with reference to the appended drawings, wherein Figure 1 is an end view of the device in position on a tube.

Figure 2 is a side view of the same device.

Figure 3 is an end view of a modification.

Figure 1:
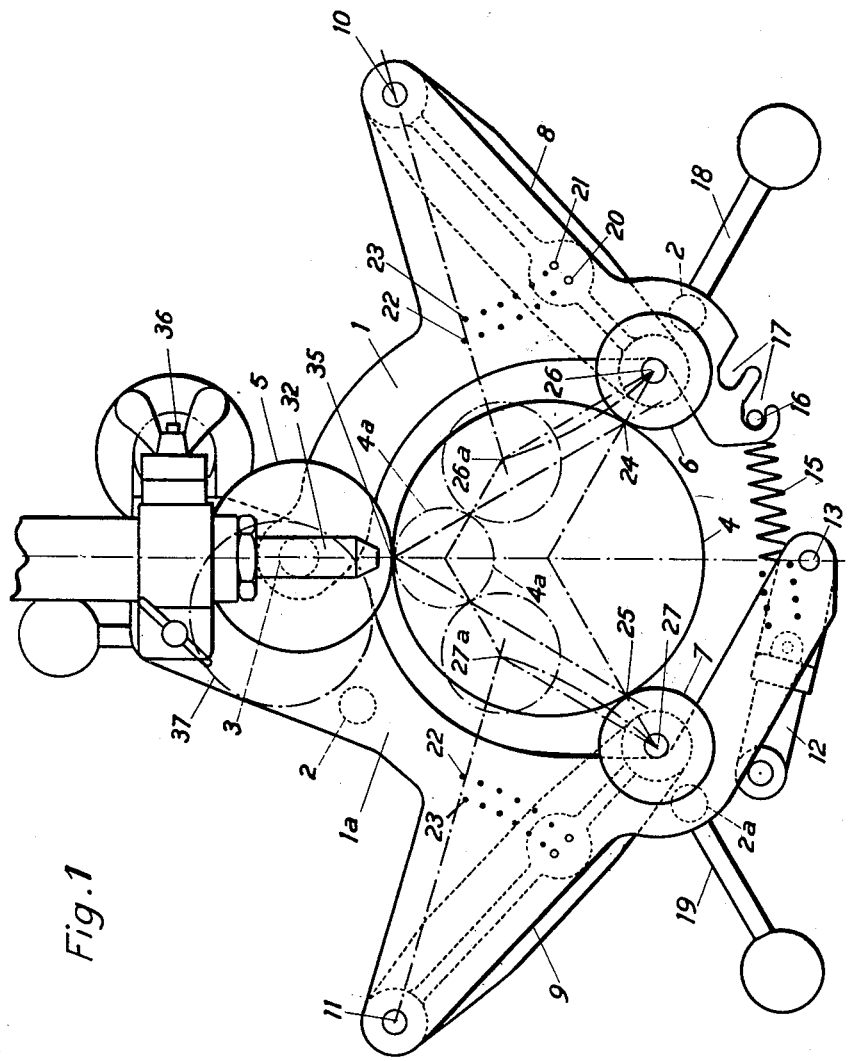

The device comprises two rigid jaws, consisting of flanges 1 and 1a, articulated about an axis 3, surrounding a tube 4 with three pairs of rollers 5, 6, 7. The rollers 5 are carried by the articulation axis 3 of the two jaws. The rollers 6 and 7 are carried by arms 8 and 9 articulated at 10 and 11 on the jaws 1 and 2. The clamping stress on the tube is ensured by a movable tensioning device comprising a lever 12, articulated at 13 at the end of the jaw 2. This lever comprises a stud 14, to which is attached the end of a spring 15, the other end of which is associated with a rod 16 which can hook into one of the notches 17 of the jaw 1. This arrangement makes it possible to stretch the spring and to adjust the stress exerted according to the nature of the tube and to free the ends of the jaws for placing the device in position on the tube to be cut. To facilitate this operation the ends of the jaws are provided with handles 18, 19 for their control.

The tube 4, shown on the drawing, is the tube having the largest diameter on which the device may be mounted. In order to be able to use it on tubes having a smaller diameter, such as the tube 4a, the articulated arms 8 and 9 may be displaced about the axles 10, 11, associated with the jaws, and may be associated with the latter, for instance, by studs engaged in the holes 20, 21 of the arm and corresponding holes 22, 23 of the jaw, arranged along two concentrical circles. The holes 22, 23, are arranged along circular sectors, the center of which coincides with the axles 10 and 11 of the articulated arms. Each hole 22 or 23 corresponds to a given diameter of the tube to be cut, provided the corresponding holes are used on each jaw. To ensure a distribution of the contact points of the rollers, equally spaced by 120° around the tube, whatever may be the diameter of the latter, the contact points of the rollers 6 and 7 with tubes of various diameters must be on the straight line going through the contact point 34 of the roller 5 and the contact points 24, 25 of the rollers 6 and 7 with the tube having the maximum diameter. The centers 26, 27 of the rollers should, therefore, be on straight lines 26, 26a, 27, 27a, parallel with the above straight lines. The solution of the pivoting arms fulfills this condition in a manner which is all the more accurate as the length of the arms 10—26, 11—27 is longer, provided the axles 10 and 11 are in planes parallel with the axis of the tube and perpendicular on the middle of the straight lines 26—26a, 27—27a.

According to the modification shown in Figure 3, a geometrically exact solution is obtained by arranging the rollers 6 and 7 on supports 28, 29, capable of sliding in the slides 30 and 31 associated with the jaws 1 and 2.

The torch 32 is mounted on a support 33 capable of sliding parallel with the axis of the part inside a guide 34, so that its axis be normal to the tube and intersects it at the contact point 34 on the generatrix 35, on which the contact of the roller 5 with the tube takes place. It is articulated about an axle 36, perpendicular on the axis of the tube to allow chamfered cuts.

The rollers 5 drive a speed limiting device 37 which ensures a constant linear speed of the cutting flame around the tube during the rotation of the tool holder.

The device represented may be adapted by adjusting the positions of the arms 8 and 9 to tubes, the diameters of which may vary in a ratio of at least 1 to 4. The rollers are provided with a knurled groove, the edges of which offer protrusions in the shape of points, which ensure a good transverse adherence for effecting straight cuts.

At least one of the rollers or pairs of rollers may be arranged in a radial plane different from that of the others, without affecting the guiding adversely.

What we claim is:

1. A rotatable tool carriage for machining cylindrical pieces, comprising a pair of jaws encircling a cylindrical piece to be machined, said jaws having a common axis at one end adapted to be disposed parallel to the axis of said cylindrical piece when engaged thereby, resilient means adapted to yieldingly draw the ends of the jaws towards each other, three sets of rollers provided on the jaws for guiding the tool around the cylindrical piece, said rollers adapted to have their axes parallel to the axis of said cylindrical piece and the axis of one set of rollers being coaxial with the axis common to the jaws, and means provided on each jaw for fastening the axis of the corresponding set of rollers on predetermined positions disposed substantially along two planes making an angle of 30 degrees with the plane passing through the axis common to the two jaws and the axis of the cylindrical piece encircled by the said pair of jaws.

2. A rotatable tool carriage for machining cylindrical pieces, comprising a pair of jaws encircling a cylindrical piece to be machined, said jaws having a common axis at one end adapted to be disposed parallel to the axis of said cylindrical piece when engaged thereby, resilient means adapted to yieldingly draw the ends of the jaws towards each other, three sets of rollers provided on the jaws for guiding the tool around the cylindrical piece, said rollers adapted to have their axes parallel to the axis of said cylindrical piece and the axis of one set of rollers being coaxial with the axis common to the jaws, the axis of the two other sets of rollers being carried by arms, the axis of each arm being hingedly connected to the corresponding jaw by an axis disposed in a plane passing through the axis of the cylindrical piece of maximum diameter which can be encircled by the jaws and making an angle of 60 degrees with the plane of symmetry of the jaws, the length of the arm being at least equal to the radius of the cylindrical piece of maximum diameter which can be encircled by said jaws.

3. A rotatable tool carriage for machining cylindrical pieces, comprising a pair of jaws encircling a cylindrical piece to be machined, said jaws having a common axis at one end adapted to be disposed parallel to the axis of said cylindrical piece when engaged thereby, resilient means adapted to yieldingly draw the ends of the jaws towards each other, three sets of rollers provided on the jaws for guiding the tool around the cylindrical piece, said rollers adapted to have their axes parallel to the axis of said cylindrical piece and the axis of one set of rollers being coaxial with the axis common to the jaws, and two other sets of rollers being provided with means to lock the said rollers on predetermined positions on slides fixed to each jaw, these slides making an angle of about 30 degrees with the plane passing through the axis common to the two jaws and through the axis of the cylinder inscribed in the jaws.

References Cited in the file of this patent

UNITED STATES PATENTS

| 2,114,978 | Horger et al. | Apr. 19, 1938 |
| 2,432,703 | Walden | Dec. 16, 1947 |
| 2,587,929 | Tyson | Mar. 4, 1952 |
| 2,612,809 | Shager | Oct. 7, 1952 |

FOREIGN PATENTS

| 602,787 | Great Britain | June 2, 1948 |